(12) United States Patent
Hart et al.

(10) Patent No.: US 7,074,378 B2
(45) Date of Patent: Jul. 11, 2006

(54) PROCESS FOR THE PURIFICATION OF $NF_3$

(75) Inventors: James Joseph Hart, Fogelsville, PA (US); Philip Bruce Henderson, Allentown, PA (US); Howard Paul Withers, Jr., Breinigsville, PA (US); Madhukar Bhaskara Rao, Fogelsville, PA (US); Hoshang Subawalla, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 15 days.

(21) Appl. No.: 10/763,365

(22) Filed: Jan. 23, 2004

(65) Prior Publication Data

US 2005/0163695 A1 Jul. 28, 2005

(51) Int. Cl.
*C01B 21/06* (2006.01)
(52) U.S. Cl. .................... 423/406; 423/241; 423/239.1
(58) Field of Classification Search ............ 423/240 R, 423/241, 240 S, 235, 239.1, 239.2, 406, 351
See application file for complete search history.

(56) References Cited

U.S. PATENT DOCUMENTS

| 4,091,081 A | 5/1978 | Woytek et al. |
|---|---|---|
| 4,156,598 A | 5/1979 | Woytek et al. |
| 4,543,242 A | 9/1985 | Aramaki et al. |
| 4,740,982 A | 4/1988 | Hakuta et al. |
| 4,933,158 A | 6/1990 | Aritsuka et al. |
| 4,964,137 A | 10/1990 | Aramaki et al. |
| 4,980,144 A | 12/1990 | Koto et al. |
| 4,983,373 A | 1/1991 | Withers, Jr. et al. |
| 5,637,285 A | 6/1997 | Coronell et al. |
| 5,832,746 A | 11/1998 | Nagamura |
| 6,352,676 B1 | 3/2002 | Hsiung et al. |

FOREIGN PATENT DOCUMENTS

EP 1 201 291 A1 5/2002

OTHER PUBLICATIONS

John T. Holmes, et al, Fluidized Bed Disposal of Fluorine, I&EC Process Design and Dev., 1967, vol. 6, No. 4, p. 408-413, no month.

*Primary Examiner*—Edward M. Johnson
(74) *Attorney, Agent, or Firm*—Geoffrey L. Chase

(57) ABSTRACT

This invention describes an improvement in a process for purifying a nitrogen trifluoride ($NF_3$) stream containing unreacted $F_2$, HF, and nitrogen oxides from an $NF_3$ reactor wherein the $F_2$, and HF are removed and then the nitrogen oxides removed by adsorption. The improvement in the process resides in selectively removing the $F_2$ from said $NF_3$ stream without generating oxygen difluoride, removing HF and then removing said nitrogen oxides by adsorption. Further purification can be effected as desired.

20 Claims, 1 Drawing Sheet

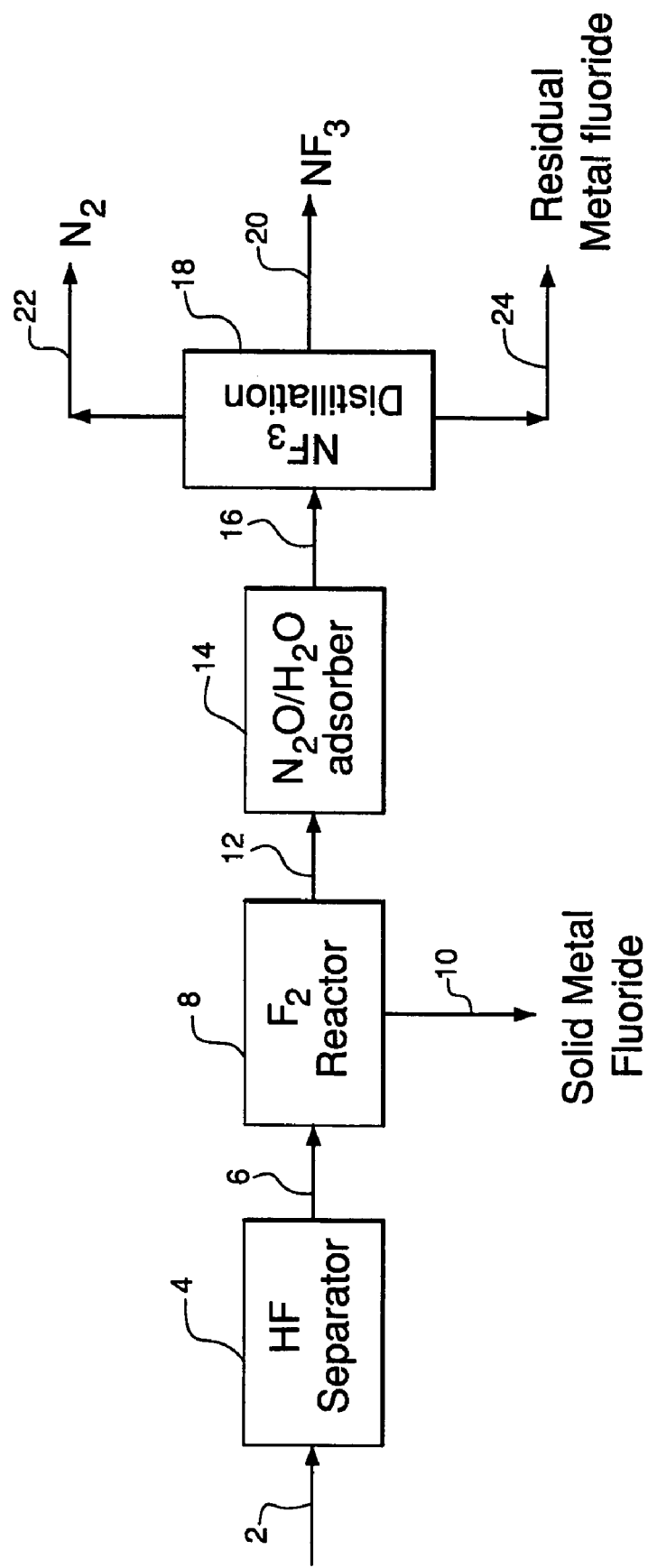

PROCESS FOR THE PURIFICATION OF $NF_3$

BACKGROUND OF THE INVENTION

There is currently a large and growing requirement for $NF_3$ in semiconductor manufacturing. One of the early processes for producing $NF_3$ involves the direct fluorination of ammonium ions by $F_2$ whereby gaseous $F_2$ is contacted with liquid (molten) ammonium acid fluoride (AAF) while gaseous $NH_3$ is separately contacted with the liquid AAF to generate ammonium ions. The early processes are operated to maintain a molar ratio of by-product HF to ammonia of 2.0 to 2.5 (melt ratio) in the reaction liquid and at temperatures above the melting point of ammonium bifluoride, $NH_4HF_2$, which is 127° C. Later processes for producing $NF_3$ effect the direct fluorination of ammonium bifluoride using increased $HF/NH_3$ melt ratios. These later processes resulted in superior $NF_3$ yields than when the lower melt ratio processes were used.

Purification of the $NF_3$ reaction product formed by the direct fluorination of ammonium bifluoride involves the removal of unreacted or unconverted $F_2$, as well as the byproducts HF, $N_2$, and trace levels of $N_2F_2$, and $N_2O$. Conventional practice in prior purification processes effects the removal of excess $F_2$ and co-product HF by aqueous KOH scrubbing followed by removal of trace levels of nitrogen oxides and water present in the stream using a solid molecular sieve adsorbent. Finally, the $NF_3$ is further purified using distillation.

The following patents and articles describe processes for production and purification of $NF_3$.

U.S. Pat. No. 4,091,081 discloses a process for the production of $NF_3$ by the direct fluorination of ammonium bifluoride at temperatures above 260° F. and below 400° F. An $HF/NH_3$ ratio of 2 to 2.5 is maintained. Purification is effected by passing the reaction product through a mist eliminator pad and then through an aqueous KOH scrubber. Residual HF and unreacted $F_2$ are removed in the scrubber. After scrubbing, the temperature of the stream is reduced to condense water and then the stream passed through molecular sieve driers for further purification.

U.S. Pat. No. 4,156,598 describes a process for the production $NF_3$ by the direct fluorination of ammonium bifluoride. Purification of the gaseous reaction stream involves passing the gaseous reaction stream through a mist eliminator pad to remove entrained ammonium fluoride or bifluoride and then through a bath capable of forming a salt of HF and $F_2$, e.g., an aqueous KOH bath. Alternatively, sodium fluoride is used in place of KOH, but $F_2$ is not removed by this method. To extend the lifetime of the adsorber columns $N_2F_2$ is removed to a level below 0.03 volume percent before adsorption of $N_2O$ and water.

U.S. Pat. No. 4,543,242 describes a process for the production and purification of $NF_3$. $NF_3$ is purified by removing HF by condensation. Further purification of $NF_3$ is accomplished by wet scrubbing of $NF_3$ using aqueous KOH followed by treatment using a molecular sieve.

U.S. Pat. No. 4,933,158 discloses a process for the purification of $NF_3$ produced by various methods, including the direct fluorination of ammonium bifluoride. Removal of $N_2O$, $CO_2$, and $N_2F_2$ from an $NF_3$ stream is accomplished by passing the stream through a thermally treated natural zeolite.

U.S. Pat. No. 4,980,144 describes a process for purification of $NF_3$ containing hydrogen fluoride, and oxygen difluoride. In the described process, $NF_3$ is generated under conditions such that $OF_2$ is generated in amounts in excess of 700 ppm. Typically, the $NF_3$ is generated by a process referred to as molten salt electrolysis wherein a salt comprised of ammonium fluoride and HF are electrolyzed. In the $NF_3$ purification process, HF is removed first by contact with water or a caustic scrubber. Then, the $OF_2$ present in the stream is removed to a level below about 10 ppm by contacting the gas with an aqueous solution of sodium thiosulfate, hydrogen iodide, and sodium sulfide. The $NF_3$ stream is then passed through a zeolite molecular sieve to remove water.

U.S. Pat. No. 5,637,285 discloses the production or $NF_3$ by the direct fluorination of ammonium bifluoride at a melt ratio of $HF/NH_3$ of at least 2.55.

BRIEF SUMMARY OF THE INVENTION

This invention describes an improvement in a process for purifying a nitrogen trifluoride ($NF_3$) stream containing unreacted $F_2$, HF and nitrogen oxides but substantially free of $OF_2$ wherein the $F_2$ and HF are removed first and then the nitrogen oxides are removed by adsorption. The improvement in the process resides in removing the $F_2$ from said $NF_3$ stream without generating oxygen difluoride, removing HF and then removing said nitrogen oxides by adsorption. Further purification can be effected as desired.

Significant advantages can be achieved by the process and these include:
 an ability to increase the life of absorber beds employed in $NF_3$ purification;
 an ability to selectively remove fluorine in a single step;
 an ability to produce a valuable fluorine-containing product while effecting removal of unreacted fluorine; and,
 an ability to reduce corrosion problems associated with the caustic scrubber, which often is responsible for a 2% loss in production due to downtime.

BRIEF DESCRIPTION OF SEVERAL VIEWS OF THE DRAWINGS

The FIGURE is a flow diagram for the production and purification of $NF_3$.

DETAILED DESCRIPTION OF THE INVENTION

This invention describes an improvement in a process for purifying nitrogen trifluoride ($NF_3$). In newly adopted processes for producing $NF_3$ in high yields, gaseous $F_2$, as the fluorine reactant, is contacted with a vigorously mixed ammonium acid fluoride complex wherein the ratio of equivalents of HF to $NH_3$ typically is such that a significant amount of fluorine, e.g., up to about 20%, typically 5 to 15% by volume can remain in the $NF_3$ product stream. The $NF_3$ stream also contains byproduct HF, and nitrogen oxides but is substantially free of oxygen difluoride ($OF_2$), i.e., typically, there is no $OF_2$ in these streams. Any $NF_3$ stream having residual fluorine and HF contained therein, but substantially free of $OF_2$ can be employed as a feedstream for the process.

It has been discovered that when the removal of residual HF and fluorine is effected using aqueous reactants such as aqueous potassium hydroxide, some of the fluorine reacts to produce small amounts, e.g., 50 to 100 ppm of oxygen difluoride. Furthermore, it has been found that this oxygen difluoride byproduct then is capable of reacting with the molecular sieve in the adsorber columns thereby shortening the service life of the adsorbent. Thus, processing $NF_3$ feedstocks containing a significant level of fluorine by conventional methods can cause problems associated with adsorber life.

A key to the improvement in the $NF_3$ purification process resides in removing unreacted $F_2$ from the $NF_3$ reaction product stream without generating oxygen difluoride and under such conditions so as not to remove a substantial amount of $NF_3$. This selective removal of $F_2$ without removing $NF_3$ is accomplished by contacting the $NF_3$ reaction stream containing unreacted fluorine with a metal or non-metal component capable of converting the fluorine to a fluoride, preferably in solid form, or in a liquid or gaseous form having substantially lower vapor pressure than $NF_3$, for efficient removal. A metal or non-metal element, metal oxide, metal sulfide, metal nitride, metal phosphide, metal arsenide, metal carbide, metal carbonate, anhydrous metal hydroxide, metal silicide, metal germanide, metal boride and metal aluminide may be used for contacting the $NF_3$ reaction product under conditions for forming a metal and/or non-metal fluoride.

Hydrogen fluoride in the reaction product normally does not react with the metal or non-metal element component used for converting the fluorine to a fluoride, e.g., a metal such as tungsten or non-metal element such as carbon, to any substantial degree. HF, therefore, can be removed subsequent to $F_2$ removal. However, small amounts of HF will react and can be removed by the metal or non-metal element component. HF will react to a substantial degree with some of the other components such as metal oxides. If these components are used, then HF can be removed prior to removal of $F_2$. If removal of hydrogen fluoride is effected prior to removal of fluorine, such removal must be done under conditions such that oxygen difluoride is not formed. Removal of hydrogen fluoride, in that case, is accomplished in the absence of a water containing medium, e.g., by cryogenic condensation.

To facilitate an understanding of the invention, reference is made to the drawing. An $NF_3$ reaction product stream 2 containing typically 40 vol % $NF_3$, 35 vol % HF, 15 vol % $F_2$, 9 vol % $N_2$, 1 vol % $N_2F_2$, and trace $N_2O$, and substantially free of $OF_2$, obtained by the direct fluorination of ammonium bifluoride, is employed for illustration. The fluorine content typically ranges from 5 to 15%. In this embodiment of the process, the stream 2 is first passed to a condenser/separator 4 to remove HF. The HF is condensed in condenser/separator 4 and removed as a liquid. Condensation of HF can be effected at subatmospheric to super atmospheric pressure and temperatures below the boiling point. Typical condensation temperatures range from −78 to −196° C. at atmospheric pressure. The condenser/separator is preferably operated under conditions sufficient to remove the maximum amount of HF with negligible $NF_3$ loss. Consequently, the vapor feed stream from condenser/separator 4 typically will contain less than 10% HF and preferably less than 2% HF.

The effluent from the condenser/separator 4 is sent via line 6 to a fluorine reactor 8 to effect removal of unreacted $F_2$. The fluorine reactor is filled with a metal or non-metal component capable of converting the unreacted fluorine to a fluoride for effective removal. A metal, metal oxide, metal compound, nonmetal element, or anhydrous metal hydroxide that can react with gaseous $F_2$ to form a fluorine-containing product is suitable. Specific examples of metals and non-metal elements for forming metal and non-metal fluorides include silicon, tungsten, iron, zinc, zirconium, sulfur, and carbon; specific examples of metal oxides include aluminum oxide, zirconium oxide, iron oxide, magnesium oxide, strontium oxide, lanthanum oxide, and calcium oxide; specific examples of anhydrous hydroxides include anhydrous aluminum hydroxide, anhydrous calcium hydroxide, anhydrous strontium hydroxide, and anhydrous magnesium hydroxide; specific examples of carbonates include calcium carbonate and sodium carbonate, and, specific examples of carbides and sulfides include silicon carbide, iron sulfide, etc. For reasons of efficiency and economy metals and non-metals such as tungsten, silicon, sulfur and carbon are selected to provide a valuable metal fluoride product.

The fluorine reactor 8 can be in the form of a packed bed, a fluidized bed or trickle bed reactor or any combination of the above. Ambient temperatures and pressures may be used in the reactor due to the high reactivity of the metal component with the unreacted fluorine. The fluorine-containing product compound typically cannot be converted back to the metal or nonmetal element or metal oxide by simple means (e.g., pressure or temperature swing cycles), and is periodically removed in the product-fluoride form from the fluorine reactor 8 via line 10 and replaced with fresh starting material. The frequency of replacement is based on the reaction capacity for a particular starting material and concentration of $F_2$ (and possibly HF) in the feed. Volatile metal and non-metal fluorides can be removed by pressure reduction when the metals or non-metals are reacted to desired completion or removed as vapor along with the effluent $NF_3$ stream.

An effluent stream in line 12 from the fluorine reactor 8 generally consists of a mixture of $NF_3$ and $N_2$, and the fluoride-product if volatile, along with some nitrogen oxides. It generally will contain less than 15 ppm HF, less than 200 ppm $F_2$, approximately 100 ppm $N_2O$ and no detectable $OF_2$. In prior processes, the fluorine reacted with the aqueous hydroxide ion in the KOH caustic scrubber generating oxygen difluoride. But, by using a non-aqueous and anhydrous compound such as a metal or nonmetal to react with the fluorine, no or only a trace amount of oxygen difluoride is formed. In contrast to other $NF_3$ purification processes, an oxygen difluoride removal step is not required.

An alternate embodiment to the above process is to effect HF separation after selective removal of fluorine in fluorine reactor 8. The HF condenser/separator when placed subsequent to fluorine reactor 8 can use multiple methods for effecting removal which includes condensation, scrubbing in an aqueous alkaline solution, e.g., aqueous potassium or sodium hydroxide, or adsorption. Aqueous or alkaline systems for removing HF prior to removal of fluorine will result in the generation of oxygen difluoride and thereby defeat the purpose of selective removal of fluorine without generating oxygen difluoride.

The effluent gas from the fluorine reactor 8 is then sent via line 12 to an adsorber 14 to remove nitrogen oxides such as $N_2O$, as well as possibly water, and the like from the effluent stream. Conventional adsorbents such as silicate-based molecular sieves or zeolites, e.g., 3A, K-zeolite, chabazite, a mordenite or carbon-based molecular sieves are used in the adsorber to effect the removal of residual water, nitrogen oxides, and other byproducts. Finally, the effluent from the adsorber rich in $NF_3$ is sent via line 16 to a distillation column 18 for final purification. A purified $NF_3$ product is removed via line 20 as a middle cut, with $N_2$ removed via line 22 as an overhead stream. Residual metal fluoride which may have been carried through the process is removed via line 24.

In summary, operating the process under conditions for effecting the removal of fluorine from an $NF_3$ reaction product stream without forming byproduct oxygen difluoride extends the life of the adsorber beds and enhances the purification process.

The following example is illustrative of another embodiment.

An $NF_3$ reaction product stream 2 is generated in conventional manner by the fluorination of ammonium bifluoride at an $NH_3$/HF melt ratio of approximately 2.6. The reaction product stream typically contains 45% $NF_3$, 32% HF, 13% $F_2$, 9% $N_2$, 1% $N_2F_2$ and 500 ppm $N_2O$. HF is removed from this stream by passing it through a shell and tube condenser/separator 4 made of Monel® pipe with cooling liquid at −78° C. from a dry ice/limonene bath circulating through the shell side at a pressure of 3 psig and flowing at 20 standard liters per minute (sLm). HF is liquefied and with even lower cooling liquid temperatures can be removed from the stream to a concentration <1.0%.

Fluorine is removed from the stream without forming $OF_2$ in a reactor constructed of Monel® pipe of 6-inch diameter equipped with a cooling jacket for circulating a cooling liquid. It is filled with 17 kg of tungsten metal powder (Type M63 from Osram Sylvania Co.) to give a bed height of 8-inches. This reactor is heated with a resistance heater to an initial temperature of 80° C. To effect removal, the stream, now containing 65% $NF_3$, 1% HF, 19% $F_2$, 13% $N_2$, 1.5% $N_2F_2$ and 700 ppm $N_2O$ after removal of HF, is passed through the tungsten-filled reactor whereupon the $F_2$ reacts completely with the tungsten metal powder to generate tungsten hexafluoride ($WF_6$) gas at 16.7 g/min. The temperature of fluorine reactor 8 is maintained between 100 and 200° C. by means of the cooling fluid circulating through the jacket. (The resistance heater is turned off because the reaction generates sufficient heat to sustain these temperatures.) The effluent stream in line 12 from the fluorine reactor 8 now contains 76% $NF_3$, <2 ppm HF, <1 ppm $F_2$, 15% $N_2$, <1 ppm $N_2F_2$, 100 ppm $N_2O$ and 8% $WF_6$. From this it can be seen that nearly all the $F_2$ reacted with the tungsten without forming $OF_2$ and, also the HF and $N_2F_2$ is removed. $N_2O$ is removed to a lower concentration.

Further purification of the $NF_3$ stream is done by passing the stream through an $N_2O$/$H_2O$ adsorber 14 made of 3-inch diameter Monel® pipe packed with 3 A molecular sieve and mordenite molecular sieve having a combined bed length of 24-inches. The effluent stream from adsorber 14 contains 76% $NF_3$, 16% $N_2$ and 8% $WF_6$. $N_2O$ is reduced to <15 ppm. The effluent stream from the adsorber filled with a 3 A molecular sieve and mordenite is sent to a distillation column 18 whereby the $WF_6$ is removed from the $NF_3$ as a higher boiling fraction from the bottom of the column via line 24 and the $N_2$ is removed from the $NF_3$ as a lower boiling fraction from the overhead via line 22. The purified $NF_3$ product is removed as a middle boiling fraction via line 20. The purity of the $NF_3$ processed in this manner is 99.996%. The $WF_6$ isolated from distillation column can be further purified to 99.9995% by distillation and can be marketed as a valuable co-product for use in semiconductor production.

The invention claimed is:

1. In a process for purifying an $NF_3$ stream containing fluorine, hydrogen fluoride, nitrogen oxides, and substantially free of oxygen difluoride, the improvement which comprises:
   first removing hydrogen fluoride and,
   removing fluorine without removing a substantial amount of $NF_3$ and without generating oxygen difluoride by contacting with a non-aqueous compound to react with the fluorine; and then
   removing the nitrogen oxides by adsorption in an adsorber; followed by
   recovering a purified $NF_3$ product.

2. The process of claim 1 wherein the fluorine is selectively removed by contacting the stream with a metal component under conditions for forming a metal fluoride.

3. The process of claim 1 wherein the fluorine is selectively removed by reaction with a non-metal component under conditions for forming a non-metal fluoride.

4. The process of claim 2 in which the metal component for selectively removing fluorine is selected from the group consisting of a metal element, metal oxide, anhydrous metal hydroxide, metal sulfide, metal nitride, metal phosphide, metal arsenide, metal carbide, metal carbonate, metal silicide, metal germanide, metal boride and metal aluminide.

5. The process of claim 4 wherein the metal element in said metal component is selected from the group consisting of tungsten, iron, zinc, silicon, aluminum, magnesium, calcium, and zirconium or mixtures thereof.

6. The process of claim 4 wherein the fluorine is removed by contact with a metal component selected from the group consisting of aluminum oxide, anhydrous aluminum hydroxide, calcium oxide, anhydrous calcium hydroxide, strontium oxide, anhydrous strontium hydroxide, magnesium oxide, anhydrous magnesium hydroxide and lanthanum oxide.

7. In a orocess for purifying an $NF_3$ stream containing fluorine, hydrogen fluoride, nitrogen oxides, and substantially free of oxygen difluoride, the improvement which comprises:
   first removing hydrogen fluoride and,
   removing fluorine without removing a substantial amount of $NF_3$ and without generating oxygen difluoride; and then,
   removing the nitrogen oxides by adsorption in an adsorber; followed by
   recovering a purified $NF_3$ product;
   wherein the fluorine is selectively removed by contact with a metal carbonate selected from the group consisting of calcium carbonate and sodium carbonate under conditions for forming a metal fluoride.

8. The process of claim 4 wherein the byproduct HF is removed by condensation prior to effecting removal of fluorine from the $NF_3$ stream.

9. The process of claim 4 wherein HF is removed subsequent to the removal of fluorine and the HF is removed by a method selected from the group consisting of condensation, scrubbing in an aqueous alkaline hydroxide solution and adsorption.

10. The process of claim 4 in which a zeolite is used as an adsorbent in the adsorber.

11. The process of claim 10 in which the zeolite is selected from the group consisting of mordenite and chabazite.

12. The process of claim 9 wherein the residual impurities in the resulting $NF_3$ stream from the adsorber are removed by distillation.

13. The process of claim 3 wherein the non-metal component is selected from the group consisting of carbon and sulfur.

14. In a process for purifying $NF_3$ present in a reaction product stream wherein said $NF_3$ is produced by contacting gaseous $F_2$, as the fluorine reactant, with an ammonium acid fluoride complex under conditions for generating a reaction product stream containing unreacted fluorine, byproduct hydrogen fluoride, and nitrogen oxides but substantially free of oxygen difluoride, the improvement which comprises:
   first removing byproduct hydrogen fluoride, and removing fluorine without removing a substantial amount of $NF_3$ and without generating oxygen difluoride by reacting a non-aqueous compound with the fluorine; and then removing the nitrogen oxides by adsorption; followed by recovering a purified $NF_3$ product.

15. The process of claim 14 wherein the reaction product stream contains from 5 to 20% fluorine by volume.

16. The process of claim 15 in which a metal component is used for selectively removing fluorine and it is selected from the group consisting of a metal element, metal oxide, anhydrous metal hydroxide, metal sulfide, metal nitride, metal phosphide, metal arsenide, metal carbide, metal carbonate, metal silicide, metal germanide, metal boride and metal aluminide.

17. The process of claim 16 wherein the metal element in said metal component is selected from the group consisting of tungsten, iron, zinc, silicon, aluminum, magnesium, calcium and zirconium or mixtures thereof.

18. The process of claim 14 wherein the fluorine is removed by contact with a metal component selected from the group consisting of aluminum oxide, anhydrous aluminum hydroxide, calcium oxide, anhydrous calcium hydroxide, strontium oxide, anhydrous strontium hydroxide, magnesium oxide, anhydrous magnesium hydroxide and lanthanum oxide.

19. The process of claim 14 wherein fluorine is selectively removed by reaction with a non-metal component under conditions for forming a non-metal fluoride.

20. The process of claim 19 wherein the non-metal component is selected from the group consisting of carbon and sulfur.

* * * * *